Sept. 23, 1930.  S. J. LESSING  1,776,442
VEHICLE SPRING
Filed Dec. 29, 1928
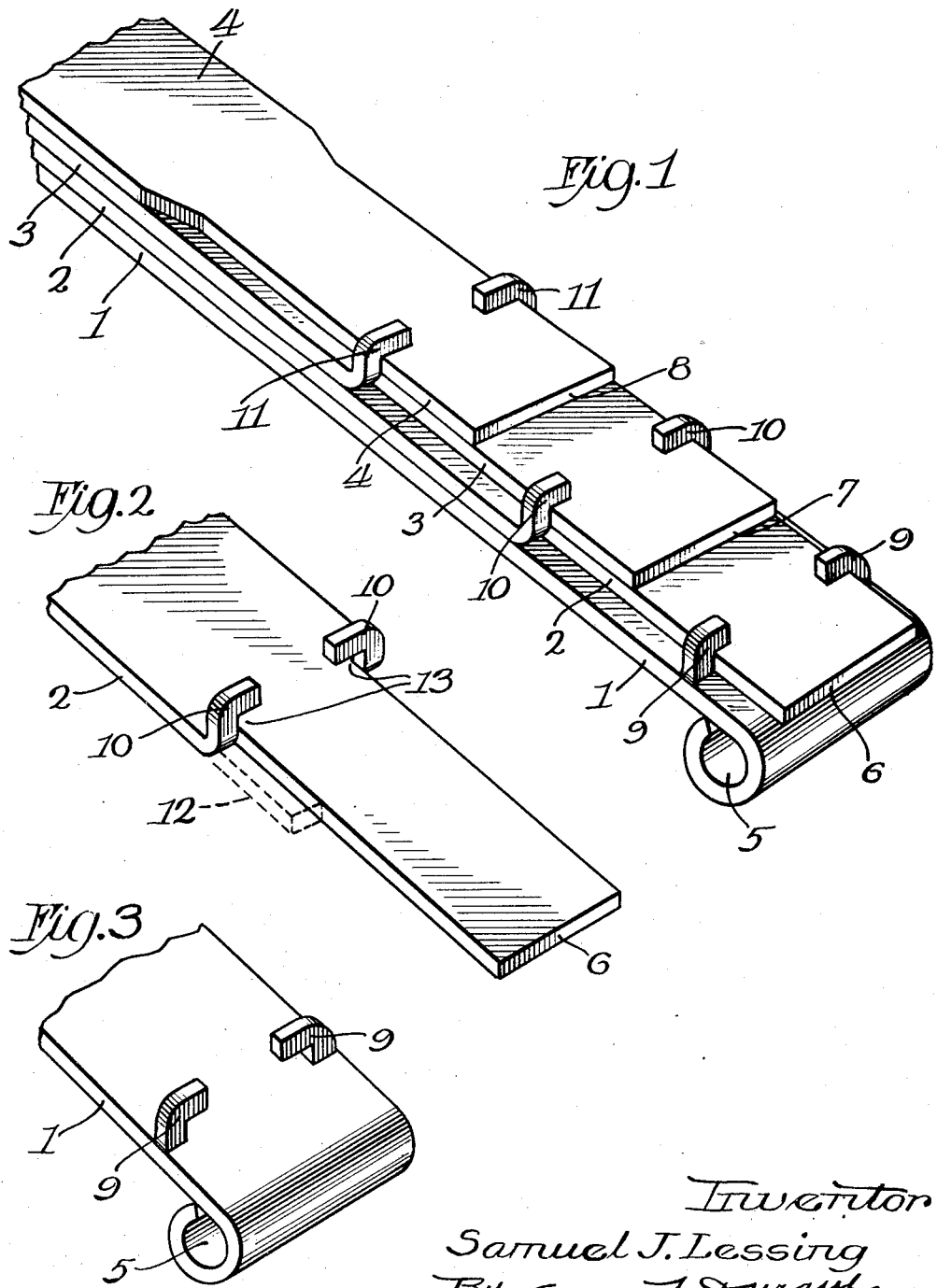

Patented Sept. 23, 1930

1,776,442

UNITED STATES PATENT OFFICE

SAMUEL J. LESSING, OF ST. JOSEPH, MICHIGAN

VEHICLE SPRING

Application filed December 29, 1928. Serial No. 329,155.

This invention relates to vehicle springs of the kind in which a plurality of spring leaves are arranged one upon another, to support the load weight in the well known manner.

Generally stated, the object of the invention is to provide a novel and improved construction whereby the leaves are not only held in alignment, against lateral displacement, but are also held down upon each other.

It is also an object to provide certain details and features of construction and combinations tending to increase the general efficiency and desirability of a vehicle spring of this particular character.

To the foregoing and other useful ends, the invention consists in matters hereinafter set forth and claimed and shown in the accompanying drawings, in which—

Figure 1 is a perspective of one end portion of a vehicle spring embodying the principles of the invention;

Figure 2 is a perspective of the end portion of one of the leaves of said spring;

Figure 3 is a perspective of another leaf of said spring.

As thus illustrated, the invention comprises a plurality of leaves 1, 2, 3 and 4, made of spring steel, or any other resilient metal or material suitable for the purpose, superposed one upon another in the manner shown. The leaf 1 has its end provided with a semi-cylindrical bent portion 5 for connection with an ordinary spring shackle, or with other means for mounting the spring. The leaf 2 has a reduced end portion 6, while the leaf 3 has a reduced end portion 7, and the leaf 4 has a reduced end portion 8, the reduced end portions being the same in width. The leaf 1 has hook-shaped lugs 9 that overhang the reduced end portion 6 to form guides for the latter. The leaf 2 has integral bent hook-shaped lugs 10, at the base of the reduced end portion 6, that overhang and bear upon the reduced end portion 7, forming a guide for the latter. Similarly, the leaf 3 has bent hook-shaped lugs 11 that overhang and bear upon the reduced end portion 8, forming a guide for the latter. The three reduced end portions 6, 7 and 8 are long enough, it will be seen, to have the necessary play or endwise sliding movement in the guides thus provided by said lugs, without disengagement of any reduced end portion from its allotted lugs.

Thus constructed, the leaves of the spring are held against lateral displacement, relative to each other, so that other means for preventing such lateral displacement are not necessary. In addition, each upper leaf is held down upon the leaf below. Moreover, while the lugs 9 may perhaps have to be welded in place on the leaf 1, it is obvious that the lugs 9, 10 and 11 may be integral with their respective leaves, being formed by portions partially cut away and then bent into shape to provide the hook-like lugs.

It will be understood, of course, that the vehicle spring thus constructed, which is illustrative of the invention, may be used in the position shown, or in the reverse position with the lugs on the under side thereof, without departing from the principles of the invention, depending upon the structure or type of the vehicle in which the spring is used. The guides thus formed for the reduced end portions of the leaves impose no limitation on the endwise relative sliding movement or displacement of the leaves, when in action under a load, and there is nothing else that imposes any such limitation, so far as the capacity of the spring to yield to its maximum flexibility is concerned.

As stated, the formation of the lugs 9, 10 and 11 is a comparatively simple matter, and involves no welding or difficult shop expedience, and involves nothing that will project beyond the maximum width of the spring, as all of the lugs are flush with the side edges of the leaf 1 of the spring. For example, the method of making the lugs 9, 10 and 11 is illustrated in Figure 2, in which the first condition of one of such lugs is shown in dotted lines at 12, the lug being thus formed by the cutting of the strap or sheet metal back to the points 13 at each side, and cutting the lugs to the right length, whereby, when bent into shape, the lugs are in the desired position and extend the desired distance over the reduced end portions of the leaves. This, it will be seen, is a method that retains the full strength of the metal for the lugs, when the spring is in use.

What I claim as my invention is:

1. In a vehicle spring, the combination of a plurality of resilient spring leaves having hook-shaped lugs at their side edges, disposed within the maximum width of the spring as a whole, formed to extend over one or more of the leaves, holding the leaves against relative lateral displacement, and holding each leaf down on another, and forming guides for the end portion of one or more of the leaves, providing smooth sides for the maximum width of the leaves.

2. A structure as specified in claim 1, one or more of the leaves having reduced end portions starting from between two lugs and laterally engaging said guides.

3. A structure as specified in claim 1, two or more of said lugs being formed integral with their allotted leaf, from portions of the side edges of the leaf.

4. A structure as specified in claim 1, two or more of said lugs being formed integral with their allotted leaf, one or more of the leaves having a reduced end portion extending straight from between the inner sides of two such lugs, whereby each lug is formed from a straight portion extending parallel a distance at each side of said reduced end portion.

5. A structure as specified in claim 1, at least two of said lugs being located upon the flat surface of one of said leaves, between the straight side edges forming the maximum width of such leaf, and another of said leaves having a reduced end portion extending between said last-mentioned lugs.

6. A structure as specified in claim 1, each of said leaves being free to have unlimited endwise sliding movement, back and forth, in its allotted guides formed by said lugs, such sliding movement being limited only by the inherent flexibility of the spring.

Specification signed this 18th day of December, 1928.

SAMUEL J. LESSING.